United States Patent
Shah et al.

(10) Patent No.: US 11,602,952 B2
(45) Date of Patent: Mar. 14, 2023

(54) WHEEL END ASSEMBLY HAVING A VENT PASSAGE

(71) Applicant: ArvinMeritor Technology, LLC, Troy, MI (US)

(72) Inventors: Deval H. Shah, Novi, MI (US); Ronald Noteboom, Armada, MI (US); Mark L. Godwin, Jr., Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 435 days.

(21) Appl. No.: 16/991,869

(22) Filed: Aug. 12, 2020

(65) Prior Publication Data

US 2022/0048318 A1 Feb. 17, 2022

(51) Int. Cl.
*B60C 23/00* (2006.01)
*B60B 27/00* (2006.01)

(52) U.S. Cl.
CPC .... *B60B 27/0073* (2013.01); *B60C 23/00318* (2020.05); *B60C 23/00336* (2020.05); *B60C 23/00363* (2020.05); *F16C 2326/02* (2013.01)

(58) Field of Classification Search
CPC .......... B60B 27/0073; B60C 23/00318; B60C 23/00336; B60C 23/00363
See application file for complete search history.

(56) References Cited

U.S. PATENT DOCUMENTS

| 4,428,630 | A | 1/1984 | Folger et al. |
| 5,174,839 | A * | 12/1992 | Schultz ............ B60C 23/00318 |
| | | | 384/489 |
| 7,255,481 | B2 * | 8/2007 | Mermoud ............ F16C 41/005 |
| | | | 152/417 |
| 8,915,274 | B2 * | 12/2014 | Eschenburg ...... B60C 23/00363 |
| | | | 152/416 |
| 9,315,077 | B2 | 4/2016 | Flory et al. |
| 9,409,449 | B2 * | 8/2016 | Cis .................... B60C 23/00363 |
| 11,130,375 | B2 * | 9/2021 | Buhrke ............ B60C 23/00363 |
| 2002/0112802 | A1 * | 8/2002 | D'Amico ............ B60C 23/0039 |
| | | | 152/415 |
| 2018/0297423 | A1 * | 10/2018 | Furtado .................. F16C 41/005 |

FOREIGN PATENT DOCUMENTS

WO WO-9216384 A1 * 10/1992 ........... B60C 23/003

\* cited by examiner

*Primary Examiner* — Scott A Browne
(74) *Attorney, Agent, or Firm* — Brooks Kushman PC

(57) ABSTRACT

A wheel end assembly having a spindle, a hub, and a rotary seal assembly. The spindle defines a spindle air passage, a vent passage, and a spindle hole. The hub defines a hub air passage. The rotary seal assembly fluidly connects the spindle air passage to the hub air passage. The vent passage fluidly connects an inboard cavity to the spindle hole.

20 Claims, 4 Drawing Sheets

WHEEL END ASSEMBLY HAVING A VENT PASSAGE

TECHNICAL FIELD

This disclosure relates to a wheel end assembly having a vent passage.

BACKGROUND

A tire inflation system having a passage for routing pressurized gas through a hub is disclosed in U.S. Pat. No. 9,315,077.

SUMMARY

In at least one embodiment, a wheel end assembly is provided. The wheel end assembly may include a spindle, a hub, an inboard wheel bearing, a hub seal, and a rotary seal assembly. The spindle may define a spindle air passage, a vent passage, and a spindle hole. The spindle hole may extend along an axis. The hub may be rotatable about the axis and may define a hub air passage that may be fluidly connectable to a tire. The inboard wheel bearing may be disposed on the spindle and may rotatably support the hub. The hub seal may extend from the spindle to the hub. The rotary seal assembly may fluidly connect the spindle air passage to the hub air passage. The hub seal and the rotary seal assembly may cooperate to at least partially define an inboard cavity. The vent passage may fluidly connect the inboard cavity to the spindle hole.

In at least one embodiment, a wheel end assembly is provided. The wheel end assembly may include a spindle, a hub, a hub seal, an inboard wheel bearing, and outboard wheel bearing, and a rotary seal assembly. The spindle may define a spindle air passage, a vent passage, and a spindle hole that may extend along an axis. The hub may be rotatable about the axis and may define a hub air passage that is adapted to be fluidly connected to a tire. The hub seal may extend from the spindle to the hub. The inboard wheel bearing and the outboard wheel bearing may extend around the spindle and may rotatably support the hub. The rotary seal assembly may be axially positioned between the inboard wheel bearing in the outboard wheel bearing. The rotary seal assembly may fluidly connect the spindle air passage to the hub air passage. The spindle, the hub, the hub seal, and the rotary seal assembly may cooperate to define an inboard cavity in which the inboard wheel bearing assembly may be disposed. The vent passage may extend from the inboard cavity to the spindle hole.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
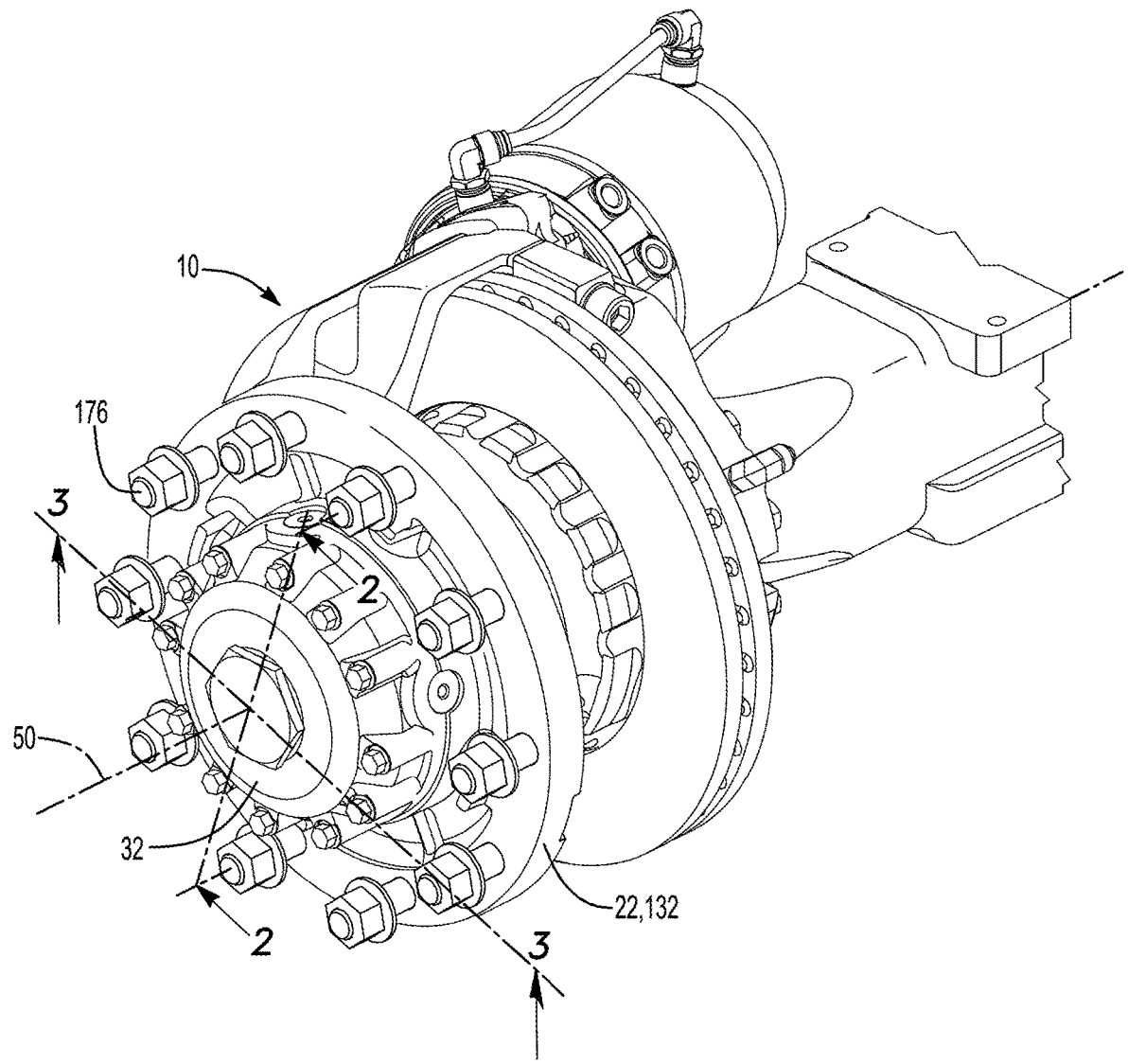
FIG. 1 is a perspective view of an example of a wheel end assembly.

Referring to FIG. 1, an example of a wheel end assembly 10 is shown. The wheel end assembly 10 may be provided with a vehicle like a truck, bus, farm equipment, mining equipment, military transport or weaponry vehicle, or cargo loading equipment for land, air, or marine vessels. The vehicle may include a trailer for transporting cargo in one or more embodiments.

The wheel end assembly 10 may be configured to support a vehicle wheel and a brake assembly. The wheel end assembly 10 may be provided in a steerable configuration or a non-steerable configuration. In a steerable configuration, the wheel end assembly 10 may be mounted to a steerable structural component, such as a steering knuckle. In a non-steerable configuration, the wheel end assembly 10 may be mounted to a non-steerable structural component, such as a non-rotatable knuckle or an axle housing of an axle assembly. In at least one configuration and as is best shown with reference to FIG. 2, the wheel end assembly 10 may include a spindle 20, a hub 22, an inboard wheel bearing 24, an outboard wheel bearing 26, a hub seal 28, and a rotary seal assembly 30. The wheel end assembly 10 may also include hub cap 32, an inboard cavity 34, and an outboard cavity 36. Optionally, the wheel end assembly 10 may be associated with an axle shaft 38 and may include a gear reduction unit 40.

Figure 2:
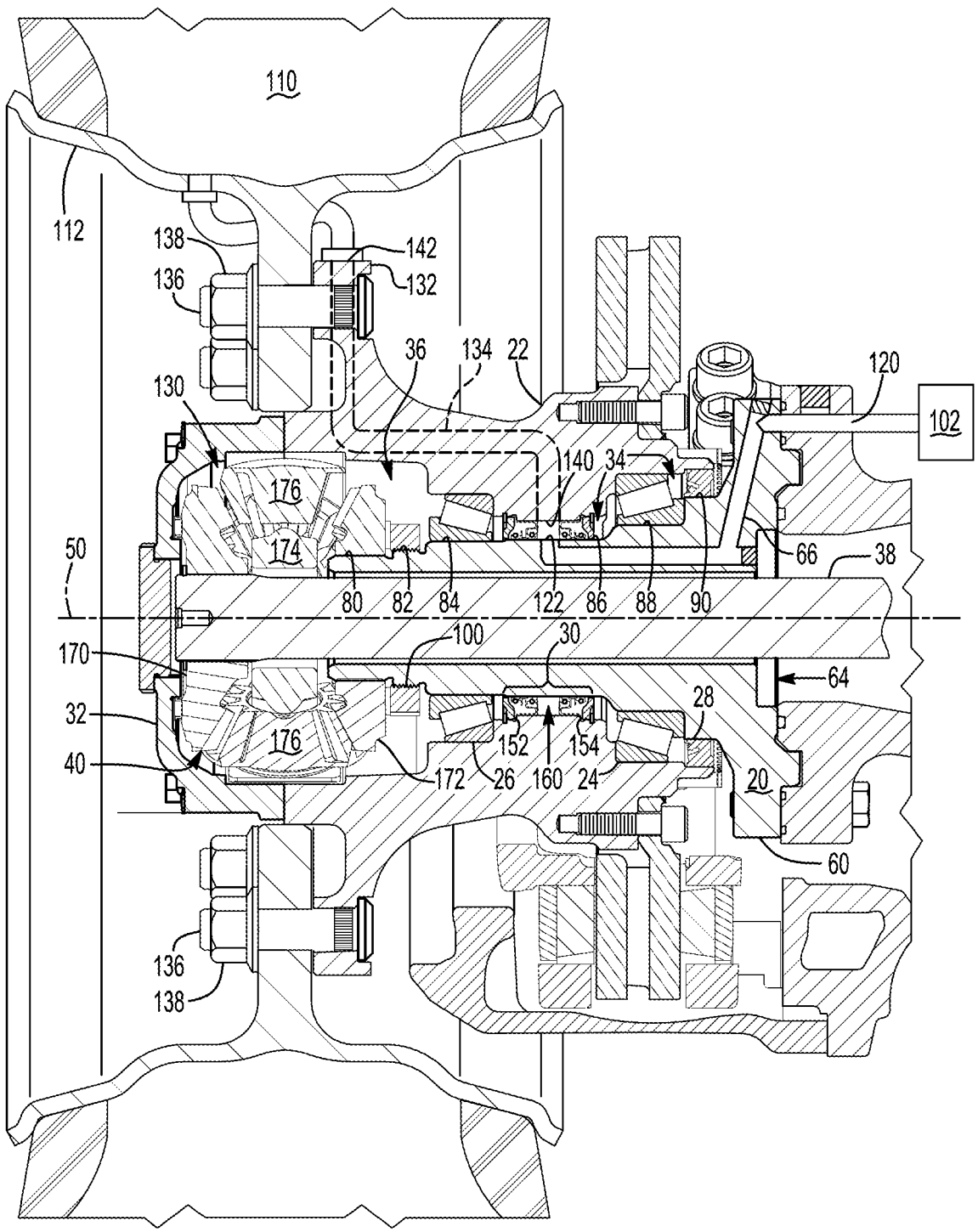
FIG. 2 is a section view along section line 2-2 that also depicts a tire and a wheel.
Figure 4:
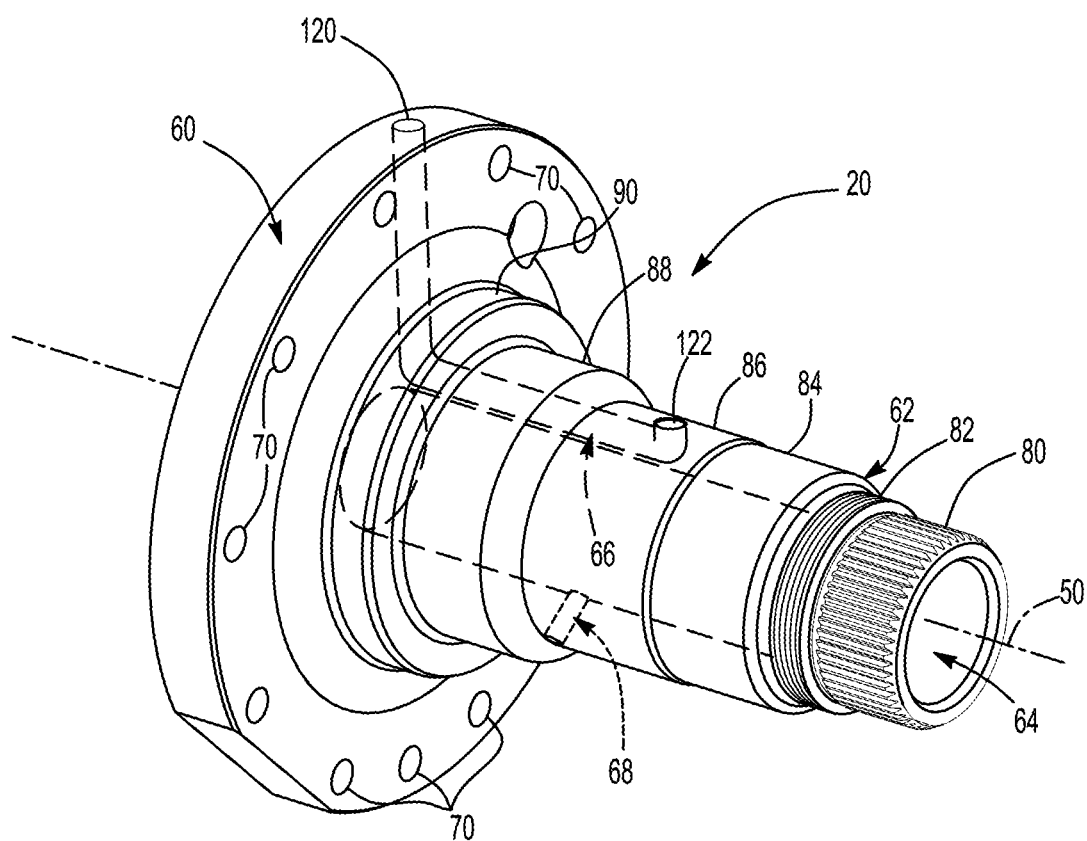
FIG. 4 is a perspective view of a spindle that may be provided with the wheel end assembly.

Referring to FIGS. 2 and 4, the spindle 20 may extend along or around an axis 50 may be configured to support components of the wheel end assembly 10. The spindle 20 may be fixedly mounted to a structural component such as a steering knuckle or axle housing as previously described. It is also contemplated that the spindle 20 may be integrally formed with the structural component rather than being a separate part from the structural component. In at least one configuration, the spindle 20 may include a mounting flange 60 and a tubular portion 62. In addition, the spindle 20 may define a spindle hole 64, a spindle air passage 66, and a vent passage 68.

The mounting flange 60 may facilitate mounting of the spindle 20 to a structural component. The mounting flange 60 may be disposed at an inboard end of the spindle 20 that may be disposed adjacent to the structural component. In at least one configuration, the mounting flange 60 may extend further away from the axis 50 than the tubular portion 62 and may extend radially outward from the tubular portion 62. Moreover, the mounting flange 60 may include a plurality of holes 70 that may receive fasteners, such as bolts, that may couple the spindle 20 to the structural component. Alternatively, the holes 70 and fasteners may be omitted and the spindle 20 may be coupled to the structural component with a weld, by press fitting, or the like. The mounting flange 60 may be disposed at an end of the tubular portion 62.

The tubular portion 62 may extend from the mounting flange 60. For instance, the tubular portion 62 may extend in an axial direction that may extend away from the mounting flange 60 in an outboard direction toward the hub cap 32. In at least one configuration, the tubular portion 62 may have an end portion 80, a threaded portion 82, a first outer surface 84, a second outer surface 86, a third outer surface 88, and a fourth outer surface 90.

The end portion 80 may be disposed at a distal end of the tubular portion 62 that may be disposed opposite the mounting flange 60. In at least one configuration, the end portion 80 may be configured to support the gear reduction unit 40. For instance, the end portion 80 may include a mating feature, such as a plurality of splines that may be arranged around the axis 50 and may extend substantially parallel to the axis 50. The splines may engage and may inhibit rotation of a gear of the gear reduction unit 40.

The threaded portion 82 may be axially positioned or positioned along the axis 50 between the end portion 80 and the first outer surface 84. The threaded portion 82 may face away from the axis 50 and may threadingly engage a preload nut 100. For instance, the preload nut 100 may be threaded onto the threaded portion 82, may inhibit axial movement of the outboard wheel bearing 26, and may exert a preload force on the outboard wheel bearing 26.

The first outer surface 84 may extend around the axis 50 and may face away from the axis 50. The first outer surface 84 may be an outside circumference of a portion of the tubular portion 62. The first outer surface 84 may be axially positioned between the threaded portion 82 and the second outer surface 86. In addition, the first outer surface 84 may be positioned further from the axis 50 than the threaded portion 82. The outboard wheel bearing 26 may be disposed on the first outer surface 84.

The second outer surface 86 may extend around the axis 50 and may face away from the axis 50. The second outer surface 86 may be an outside circumference of a portion of the tubular portion 62. The second outer surface 86 may be axially positioned between the first outer surface 84 and the mounting flange 60. For instance, the second outer surface 86 may be axially positioned between the first outer surface 84 and the third outer surface 88. In addition, the second outer surface 86 may be disposed further from the axis 50 than the first outer surface 84 and may have a larger diameter than the first outer surface 84 to help inhibit axial movement of the inner race of the outboard wheel bearing 26 toward the mounting flange 60. The rotary seal assembly 30 may be disposed on the second outer surface 86. It is also contemplated that the second outer surface 86 may be omitted and the outboard wheel bearing 26 and the rotary seal assembly 30 may be disposed on a common surface, such as the first outer surface 84.

The third outer surface 88 may extend around the axis 50 and may face away from the axis 50. The third outer surface 88 may be an outside circumference of a portion of the tubular portion 62. The third outer surface 88 may be axially positioned between the second outer surface 86 and the mounting flange 60. For instance, the third outer surface 88 may be axially positioned between the second outer surface 86 and the fourth outer surface 90. In addition, the third outer surface 88 may be disposed further from the axis 50 than the second outer surface 86 and may have a larger diameter than the second outer surface 86. The inboard wheel bearing 24 may be disposed on the third outer surface 88.

The fourth outer surface 90 may extend around the axis 50 and may face away from the axis 50. The fourth outer surface 90 may be an outside circumference of a portion of the tubular portion 62. The fourth outer surface 90 may be axially positioned between the third outer surface 88 and the mounting flange 60. In at least one configuration, the fourth outer surface 90 may extend from the mounting flange 60. The fourth outer surface 90 may be disposed further from the axis 50 than the third outer surface 88 and may have a larger diameter than the third outer surface 88 to help inhibit axial movement of the inner race of the inboard wheel bearing 24 toward the mounting flange 60. The hub seal 28 may be disposed on the fourth outer surface 90.

The spindle hole 64 may be a through hole that may extend through the spindle 20. The spindle hole 64 may extend along the axis 50 and may extend from the mounting flange 60 to the end portion 80. The mounting flange 60 and the tubular portion 62 may cooperate to define the spindle hole 64.

The spindle air passage 66 may help fluidly connect a pressurized gas source 102 to a tire 110 that may be mounted on a wheel 112. In at least one configuration, the spindle air passage 66 may extend through the mounting flange 60 and the tubular portion 62 of the spindle 20. Moreover, the spindle air passage 66 may be spaced apart from and may not be fluidly connected to the spindle hole 64 and the vent passage 68. The spindle air passage 66 may have a first port 120 and a second port 122.

The first port 120 may be fluidly connected to the pressurized gas source 102. In at least one configuration, the first port 120 may be provided in the mounting flange 60.

The second port 122 may be disposed at an opposite end of the spindle air passage 66 from the first port 120. The second port 122 may be fluidly connected to an air passage in the hub via the rotary seal assembly 30. The second port 122 may be provided in the tubular portion 62. For instance, the second port 122 may extend from the second outer surface 86. The second port 122 may be axially positioned further from the first port 120 or closer to the distal end of the spindle 20 than the vent passage 68.

The vent passage 68 may fluidly connect the inboard cavity 34 to the spindle hole 64. The vent passage 68 may be axially positioned between the rotary seal assembly 30 and the inboard wheel bearing 24. For instance, the vent passage 68 may extend from the second outer surface 86 to the spindle hole 64. The vent passage 68 may be axially positioned closer to the second port 122 of the spindle air passage 66 than to the first port 120. In addition, the vent passage 68 may be disposed substantially perpendicular to the axis 50. The vent passage 68 may be rotational offset from the spindle air passage 66. For instance, when viewed from the distal end of the spindle 20 the vent passage 68 may be rotated about the axis 50 with respect to the spindle air passage 66 such that the spindle air passage 66 may extend along a first plane that may extend perpendicular to the axis 50 while the vent passage 68 may extend along a second plane that may extend perpendicular to the axis 50 and that may intersect the first plane at the axis 50. In at least one configuration, the angle between the first plane and the second plane may be between 90° and 180° when viewed along the axis 50.

Referring to FIGS. 1 and 2, the hub 22 may be rotatable about the axis 50 with respect to the spindle 20. In addition, the hub 22 may be configured to facilitate mounting of the wheel 112. In a drive axle configuration and as is best shown in FIG. 2, the hub 22 may be operatively connected to an axle shaft 38. In at least one configuration, the hub 22 may include a hub cavity 130, a hub mounting flange 132, and a hub air passage 134.

The hub cavity 130 may extend around the axis 50. The hub cavity 130 may receive at least a portion of various components of the wheel end assembly 10, such as the spindle 20, the inboard wheel bearing 24, the outboard wheel bearing 26, the hub seal 28, the rotary seal assembly 30, and the gear reduction unit 40.

The hub mounting flange 132 may facilitate mounting of the wheel 112. For example, the hub mounting flange 132 may extend away from the axis 50 and may include a set of mounting fastener holes that may each receive a mounting lug bolt 136. A mounting lug bolt 136 may extend through a corresponding hole in the wheel 112. A lug nut 138 may be threaded onto a mounting lug bolt 136 to secure the wheel 112 to the hub 22.

The hub air passage 134 may fluidly connect the spindle air passage 66 to the tire 110. The hub air passage 134 may extend through the hub 22. The hub mounting flange 132 may have a first port 140 and a second port 142.

The first port 140 may be fluidly connected to the second port 122 of the spindle air passage 66. For instance, the first port 140 may be disposed proximate the rotary seal assembly 30.

The second port 142 may be disposed at an opposite end of the hub air passage 134 from the first port 140. The second port 142 may be fluidly connected to a conduit, such as a hose or tube, that may extend to a fitting or tire valve that may be mounted on the wheel 112.

The inboard wheel bearing 24 may be disposed on the spindle 20 and may rotatably support the hub 22. In addition, the inboard wheel bearing 24 may be disposed in the inboard cavity 34. The inboard wheel bearing 24 may have any suitable configuration. For instance, the inboard wheel bearing 24 may include a plurality of rolling elements, such as balls or rollers, that may be disposed between an inner race and an outer race. The inner race may extend around and may be disposed on a surface of the spindle 20, such as the third outer surface 88. As such, the inboard wheel bearing 24 may be axially positioned closer to the mounting flange 60 than the outboard wheel bearing 26. The outer race may engage the hub 22 and may extend around the inner race. In at least one configuration, the inboard wheel bearing 24 may have a larger diameter than the outboard wheel bearing 26.

The outboard wheel bearing 26 may be disposed on the spindle 20 and may rotatably support the hub 22. In addition, the outboard wheel bearing 26 may be disposed in the outboard cavity 36. The outboard wheel bearing 26 may have any suitable configuration. For instance, the outboard wheel bearing 26 may include a plurality of rolling elements, such as balls or rollers, that may be disposed between an inner race and an outer race. The inner race may extend around and may be disposed on a surface of the spindle 20, such as the first outer surface 84. As such, the outboard wheel bearing 26 may be axially positioned further from the mounting flange 60 than the inboard wheel bearing 24. The outer race may engage the hub 22 and may extend around the inner race. In at least one configuration, the inboard wheel bearing 24 may have a larger diameter than the outboard wheel bearing 26.

The hub seal 28 may extend from the spindle 20 to the hub 22. For example, the hub seal 28 may extend from the fourth outer surface 90 of the spindle 20 in a direction that extends away from the axis 50 to the hub 22. The hub seal 28 may be disposed near an inboard end of the hub 22 that may be disposed closest to the mounting flange 60 of the spindle 20. The hub seal 28 may be axially positioned between the inboard wheel bearing 24 and the mounting flange 60. The hub seal 28 may partially define the inboard cavity 34. Moreover, the hub seal 28 may be a non-self-venting seal that may not vent a fluid, such as a liquid or gas. As such, the hub seal 28 may not vent a fluid from the inboard cavity 34 to the surrounding environment.

The rotary seal assembly 30 may fluidly connect the spindle air passage 66 to the hub air passage 134. The rotary seal assembly 30 may extend from the spindle 20 to the hub 22. For example, the rotary seal assembly 30 may extend from the second outer surface 86 of the spindle 20 in a direction that extends away from the axis 50 to the hub 22. The rotary seal assembly 30 may be axially positioned between the inboard wheel bearing 24 and the outboard wheel bearing 26. The rotary seal assembly 30 may seal against the spindle 20 and the hub 22 in a manner that permits the hub 22 to rotate with respect to the spindle 20. As one example, the rotary seal assembly 30 may be fixedly disposed on the spindle 20 such that the rotary seal assembly 30 does not rotate with respect to the spindle 20 and the hub 22 may rotate with respect to the rotary seal assembly 30. As another example, the rotary seal assembly 30 may be fixedly disposed on the hub 22 such that the hub 22 and the rotary seal assembly 30 may be rotatable with respect to the spindle 20. The rotary seal assembly 30 may have any suitable configuration. For instance, the rotary seal assembly 30 may extend continuously around the spindle 20 and may have an inboard sealing portion 150 and an outboard sealing portion 152. The inboard sealing portion 150 may extend from the spindle 20 to the hub 22 and may be axially positioned between the inboard wheel bearing 24 and the second port 122 of the spindle air passage 66. The outboard sealing portion 152 may extend from the spindle 20 to the hub 22 and may be axially positioned between the outboard wheel bearing 26 and the second port 122 of the spindle air passage 66. As such, the spindle 20, the hub 22, the inboard sealing portion 150, and the outboard sealing portion 152 may cooperate to define a chamber 160 from which the second port 122 of the spindle air passage 66 and the first port 140 of the hub air passage 134 may extend.

Referring to FIGS. 1 and 2, the hub cap 32 may be mounted to the hub 22. For example, the hub cap 32 may be attached to an end of the hub 22 that faces away from the mounting flange 60 of the spindle 20. The hub cap 32 may enclose an outboard end of the hub cavity 130.

Figure 3:
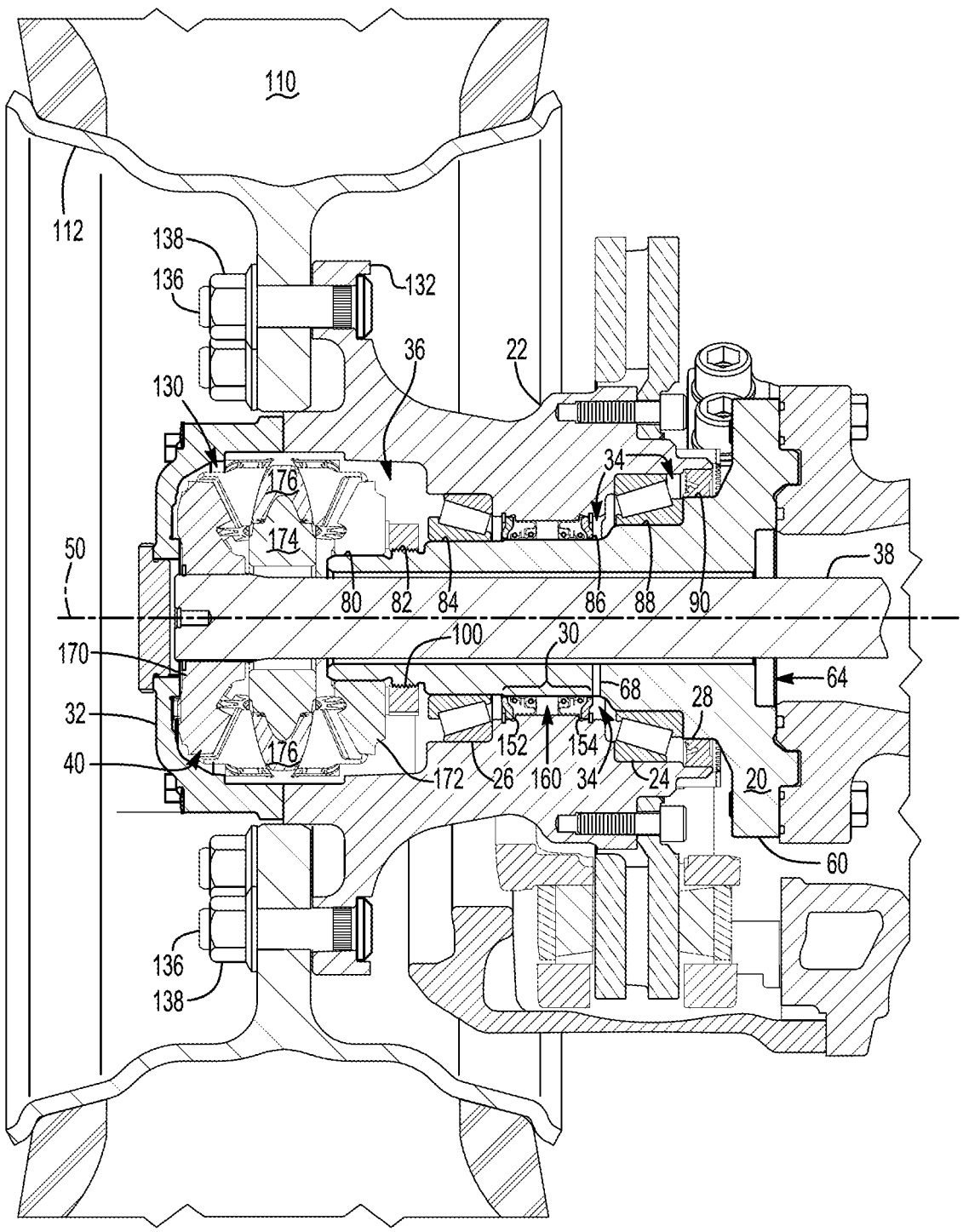
FIG. 3 is a section view along section line 3-3.

Referring to FIGS. 2 and 3, the inboard cavity 34 may be disposed between the spindle 20 and the hub 22. More specifically, the spindle 20, the hub 22, the hub seal 28, and the rotary seal assembly 30 may cooperate to define the inboard cavity 34. The inboard cavity 34 may be radially positioned between the spindle 20 and the hub 22 and may be axially positioned between the hub seal 28 and the inboard sealing portion 150 of the rotary seal assembly 30. The inboard wheel bearing 24, a portion of the second outer surface 86 of the spindle 20, and the third outer surface 88 of the spindle 20 may be disposed in the inboard cavity 34. As is best shown in FIG. 3, the vent passage 68 may fluidly connect the inboard cavity 34 to the spindle hole 64. In at least one configuration, the vent passage 68 may be the only opening or passage that fluidly connects the inboard cavity 34 to another cavity, chamber or hole of the wheel end assembly 10.

The outboard cavity 36 may be spaced apart from the inboard cavity 34. The spindle 20, the hub 22, the rotary seal assembly 30, and the hub cap 32 may cooperate to define the outboard cavity 36. The outboard cavity 36 may generally be positioned at an end of the spindle 20. For instance, the outboard cavity 36 may be axially positioned between the outboard wheel bearing 26 and the hub cap 32. The outboard cavity 36 may receive the preload nut 100 and the gear reduction unit 40, if provided. The outboard cavity 36 may be fluidly connected to the spindle hole 64 via the opening at the distal end of the spindle 20 through which the axle shaft 38 may extend. The spindle hole 64 may be fluidly connected to the surrounding environment via a valve that may be remotely located from the spindle 20 to help facilitate pressure equalization.

The axle shaft 38, if provided, may provide torque to the wheel end assembly 10. For instance, the axle shaft 38 may be operatively connected at a first end to a vehicle drivetrain component, such as a differential or vehicle power source, and may be coupled to or operatively connected to the wheel end assembly 10 at a second end. In at least one embodiment, the axle shaft 38 or a portion thereof may extend along the axis 50. For example, the axle shaft 38 or a portion thereof may extend through the spindle hole 64 to the gear reduction unit 40. It is also contemplated that the axle shaft 38 may be configured for use with an independent suspension system and may have multiple shaft segments and/or joints that may facilitate relative movement between the first end and the wheel end assembly 10.

The gear reduction unit 40 may operatively connect the axle shaft 38 to the hub 22. The gear reduction unit 40 may be at least partially disposed in the hub 22 and may transmit torque from the axle shaft 38 to the hub 22. In at least one configuration, the gear reduction unit 40 may include a first side gear 170, a second side gear 172, a spider 174, and one or more pinion gears 176.

The first side gear 170 may be disposed inside the outboard cavity 36. In addition, the first side gear 170 may be disposed further outboard or closer to the hub cap 32 than the second side gear 172. The first side gear 170 may be fixedly disposed on the axle shaft 38. For instance, the first side gear 170 may have a hole that may receive the axle shaft 38 such that the first side gear 170 may rotate with the axle shaft 38. For example, the first side gear 170 may have a spline that mates with a corresponding spline on the axle shaft 38 such that the first side gear 170 may not rotate with respect to the axle shaft 38. The first side gear 170 may also have a set of teeth that may face toward and may be spaced apart from the spider 174. The set of teeth that may be arranged around the axis 50 and that may mate or mesh with teeth on one or more pinion gears 176.

The second side gear 172 may also be disposed inside the outboard cavity 36. The second side gear 172 may be disposed on an opposite side of the spider 174 with respect to the first side gear 170. The second side gear 172 may be fixedly disposed on the spindle 20. For instance, the second side gear 172 may have a hole that may receive the spindle 20 such that the second side gear 172 may be fixed to the spindle 20. For example, the second side gear 172 may have a spline that mates with a corresponding spline on the spindle 20 such that the second side gear 172 may not rotate with respect to the spindle 20. The second side gear 172 may also have a set of teeth that may face toward and may be spaced apart from the spider 174. The set of teeth may be arranged around the axis 50 and may mate or mesh with teeth on one or more pinion gears 176.

The spider 174 may be disposed in the outboard cavity 36 and may be axially positioned between the first side gear 170 and the second side gear 172. In at least one configuration, the spider 174 may include a spider hole and one or more spider shafts.

The spider hole may be disposed along the axis 50. The axle shaft 38 may extend through the spider hole. Optionally, a bearing may be disposed in the spider hole that may receive the axle shaft 38 and may facilitate rotation of the spider 174 with respect to the axle shaft 38.

One or more spider shafts may extend away from the axis 50. Each spider shaft may be fixedly mounted to the hub 22, hub cap 32, or both. For instance, an end of a spider shaft may be received in a hole that is defined by the hub 22, the hub cap 32, or both.

One or more pinion gears 176 may be disposed in the outboard cavity 36. A pinion gear 176 may be rotatably disposed on a corresponding spider shaft. For example, each pinion gear 176 may have a pinion gear hole that may receive a corresponding spider shaft. Optionally, a bearing may be disposed in the pinion gear hole between the spider shaft and the pinion gear 176 to facilitate rotation of the pinion gear 176 with respect to the spider shaft. Each pinion gear 176 may include a set of teeth that mate with teeth on the first side gear 170 and teeth on the second side gear 172. As such, the pinion gears 176 may be in meshing engagement with the first side gear 170 and the second side gear 172.

A wheel end assembly as described above may facilitate venting of an inboard cavity. More specifically, the inboard cavity may be vented via the vent passage in the spindle. Such a configuration may allow a hub seal to be provided that is not self-venting or that does not have venting capability, which may reduce complexity and cost and may help provide a more robust seal interface.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wheel end assembly comprising:
   a spindle that defines a spindle air passage, a vent passage, and a spindle hole that extends along an axis;
   a hub that is rotatable about the axis and that defines a hub air passage that is adapted to be fluidly connected to a tire;
   an inboard wheel bearing that is disposed on the spindle and rotatably supports the hub;
   a hub seal that extends from the spindle to the hub; and
   a rotary seal assembly that fluidly connects the spindle air passage to the hub air passage, wherein the hub seal and the rotary seal assembly cooperate to at least partially define an inboard cavity, and the vent passage fluidly connects the inboard cavity to the spindle hole.

2. The wheel end assembly of claim 1 wherein the spindle and the hub cooperate with the rotary seal assembly and the hub seal to define the inboard cavity.

3. The wheel end assembly of claim 1 wherein the inboard wheel bearing is disposed in the inboard cavity.

4. The wheel end assembly of claim 1 wherein the spindle air passage is spaced apart from and is not fluidly connected to the spindle hole and the vent passage.

5. The wheel end assembly of claim 1 wherein the vent passage is axially positioned between the rotary seal assembly and the inboard wheel bearing.

6. The wheel end assembly of claim 1 wherein the vent passage is disposed substantially perpendicular to the axis.

7. The wheel end assembly of claim 1 wherein the spindle air passage has a first port and a second port, the vent passage is axially positioned closer to the second port than the first port, and the second port is axially positioned further from the first port than the vent passage.

8. The wheel end assembly of claim 1 further comprising an outboard wheel bearing that is disposed on the spindle and rotatably supports the hub, wherein the rotary seal assembly is axially positioned between the inboard wheel bearing and the outboard wheel bearing.

9. The wheel end assembly of claim 8 wherein the outboard wheel bearing is disposed in an outboard cavity that is at least partially defined by the hub and a hub cap that is disposed on an end of the hub.

10. The wheel end assembly of claim 9 wherein the spindle and the rotary seal assembly cooperate with the hub and the hub cap to define the outboard cavity.

11. The wheel end assembly of claim 9 wherein the outboard cavity is fluidly connected to the spindle hole.

12. The wheel end assembly of claim 9 wherein the outboard cavity receives a gear reduction unit.

13. The wheel end assembly of claim 12 wherein an axle extends through the spindle hole to the gear reduction unit.

14. A wheel end assembly comprising:
- a spindle that defines a spindle hole that extends along an axis, a spindle air passage, and a vent passage;
- a hub that is rotatable about the axis and that defines a hub air passage that is adapted to be fluidly connected to a tire;
- a hub seal that extends from the spindle to the hub;
- an inboard wheel bearing and an outboard wheel bearing that extend around the spindle and rotatably support the hub; and
- a rotary seal assembly that is axially positioned between the inboard wheel bearing and the outboard wheel bearing and that fluidly connects the spindle air passage to the hub air passage, wherein the spindle, the hub, the hub seal, and the rotary seal assembly cooperate to define an inboard cavity in which the inboard wheel bearing is disposed, and wherein the vent passage extends from the inboard cavity to the spindle hole.

15. The wheel end assembly of claim 14 wherein the spindle air passage has a first port and a second port, and wherein the spindle includes a tubular portion and a mounting flange that is disposed at an end of the tubular portion and extends radially outward from the tubular portion, wherein the first port is provided in the mounting flange.

16. The wheel end assembly of claim 15 wherein the tubular portion has a first outer surface that extends around the axis, wherein the outboard wheel bearing engages the first outer surface.

17. The wheel end assembly of claim 16 wherein the tubular portion has a second outer surface that extends around the axis and has a larger diameter than the first outer surface, wherein the rotary seal assembly is disposed on the second outer surface and the spindle air passage and the vent passage extend from the second outer surface.

18. The wheel end assembly of claim 17 wherein the spindle includes a third outer surface that is disposed further from the axis than the second outer surface and is axially positioned between the second outer surface and the mounting flange, wherein the inboard wheel bearing is disposed on the third outer surface.

19. The wheel end assembly of claim 18 wherein the spindle includes a fourth outer surface that is disposed further from the axis than the third outer surface and is axially positioned between the third outer surface and the mounting flange, wherein the hub seal is disposed on the fourth outer surface.

20. The wheel end assembly of claim 14 wherein the hub seal is a non-self-venting seal that does not vent the inboard cavity.

* * * * *